(12) United States Patent
Lin et al.

(10) Patent No.: US 7,781,561 B2
(45) Date of Patent: Aug. 24, 2010

(54) PROCESSES OF SYNTHESIZING AROMATIC AMINE-BASED BENZOXAZINE RESINS

(75) Inventors: Ching-Hsuan Lin, Taichung (TW); Ya-Ru Taso, Taipei (TW); Jhao-Wei Sie, Erlin Township, Changhua County (TW); Hao-Hsin Lee, Taichung (TW)

(73) Assignee: National Chungsing University, Taichung (TW)

( * ) Notice: Subject to any disclaimer, the term of this patent is extended or adjusted under 35 U.S.C. 154(b) by 517 days.

(21) Appl. No.: 11/889,810

(22) Filed: Aug. 16, 2007

(65) Prior Publication Data

US 2008/0045688 A1 Feb. 21, 2008

(30) Foreign Application Priority Data

Aug. 17, 2006 (TW) .............................. 95130293 A (51) Int. Cl.
*C08G 12/06* (2006.01)
*C08G 12/40* (2006.01)
*C08G 14/073* (2006.01)

(52) U.S. Cl. ........................ 528/243; 528/232; 528/239; 528/482; 528/488; 528/491; 528/495; 528/497; 528/503

(58) Field of Classification Search ................. 528/243, 528/232, 239, 482, 488, 491, 495, 497, 503
See application file for complete search history.

(56) References Cited

U.S. PATENT DOCUMENTS 5,686,486 A * 11/1997 Tomich et al. ............... 514/456

* cited by examiner

*Primary Examiner*—Duc Truong
(74) *Attorney, Agent, or Firm*—Muncy, Geissler, Olds & Lowe, PLLC (57) ABSTRACT

Processes of synthesizing aromatic amine-based benzoxazine resins are disclosed. The processes provide new routes for synthesizing benzoxazine from aromatic diamines or multifunctional aromatic amines that may solve the problem of insoluble products resulted from the condensation of hydroxymethylamine with amine by using aromatic diamine, phenol and formaldehyde as a raw materials.

15 Claims, 5 Drawing Sheets

PROCESSES OF SYNTHESIZING AROMATIC AMINE-BASED BENZOXAZINE RESINS

RELATED APPLICATIONS

The application claims priority to Taiwan Application Serial Number 95130293, filed Aug. 17, 2006, which is herein incorporated by reference.

BACKGROUND

1. Field of Invention

The present invention relates to processes of synthesizing aromatic amine-based benzoxazine resin. More particularly, the present invention relates to processes of synthesizing benzoxazines by employing multifunctional aromatic amines as a material.

2. Description of Related Art

Phenol formalde resin is a common thermosetting resin, which made by polycondensating the phenol monomer with aldehyde monomer. Benzoxazine is one of the phenol formalde resins, and the particularity of the benzoxazine monomer is the ring structure could be opened and the cured by heating. In compared with the conventional phenol formaldehyde resins, the benzoxazine is uninflammable and provides higher glass transition temperature (Tg), higher modulus, lower moisture absorption, greater electric properties, and higher char yield. Besides, the benzoxazine harden process is strong acid catalyst unneeded, no by-product produced and none of volume changed in progress.

The most commonly used benzoxazine is B-m and B-a. The synthesis of the B-m is reacting the diphenol A with formaldehyde and methylamine. The synthesis of the B-a is reacting the diphenol with formaldehyde and aniline. The routes of synthesizing the B-m and B-a resin are presented as follow:

B-a

SUMMARY

The present invention is directed to a process for synthesizing benzoxazine resin with high purity and solving the problem of insoluble products resulted from the conventional process of benzoxazine synthesis.

In accordance with the foregoing and other aspects, the processes of synthesizing benzoxazine resin are disclosed. The embodiments of the present invention employ a three-step process to synthesize benzoxazine by reacting 2-hydroxybenzaldehyde with multifunctional aromatic amines.

In accordance with an embodiment of the present invention, a process was carried out by reacting the 2-hydroxybenzaldehyde with the difunctional aromatic amine in a solvent N,N-dimethylformamide (DMF) to form a first intermediate; dissolving the first intermediate with ethanol in a reactor and adding a reducing agent sequentially to form a mixture; adding the mixture into water to separate a second intermediate out. Then redissolving the second intermediate with a solvent to form a second intermediate solution; mixing the second intermediate solution in an aldehyde solution and stirring within a working temperature until reflux to form a second mixture. Finally removing the solvent from the second mixture to obtain a purified benzoxazine resin.

In accordance with another embodiment of the present invention, a process was carried out by reacting 2-hydroxybenzaldehyde with a trifunctional aromatic amine in a ethanol solution to form a first mixture, and adding a reducing agent to the first mixture and stirring the first mixture to form a first intermediate; adding the first mixture into water to separate the first intermediate out. Then redissolving the first intermediate with a solvent to form a first intermediate solution, and mixing the first intermediate solution in an aldehyde solution and stirring within a working temperature until reflux to form a second mixture. Finally, removing the solvent from the second mixture to separate a product of benzoxazine resin.

It is to be understood that both the foregoing general description and the following detailed description are by examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Reference will now be made in detail to the present preferred embodiments of the invention, examples of which are illustrated in the accompanying drawings.

In accordance with an embodiment of the present invention, benzoxazine resins were synthesized by reacting the 2-hydroxybenzaldehyde with different difunctional aromatic amines. The synthesis strategy of the benzoxazine is described in the following steps:

Step (I): Synthesizing a first intermediate. The first intermediate was synthesized by mixing 2-hydroxybenzaldehyde with aromatic diamine (or triamine) in DMF at room temperature.

Step (II): Synthesizing a second intermediate. The synthesis of the second intermediate was accomplished using the first intermediate as a raw material. The first intermediate was redissolved in ethanol in a reactor, and then a reducing agent (such as NaBH$_4$, LiAlH$_4$, hydrazine-Pd/c and hydrogen-Pd/c) was added into the reactor in batches and the two reactants were stirred at temperature to form a first mixture. The first mixture was then added into water to precipitate a second intermediate.

Step (III): Synthesizing a benzoxazine monomer. The second intermediate was redissolved in a solvent (such as dioxane, toluene, xylene, or chloroform) to form a second mixture, and an aldehyde solution (such as formaldehyde or paraformaldehyde) was mixed into the second mixture and stirred at a working temperature (about 35° C.) until reflux. The mixed second mixture was added into an ethanol solution (ethanol:water=1:1) to precipitate the raw benzoxazine monomer. Then the remaining solvents were further removed from the benzoxazine monomer.

In accordance with an embodiment of the present invention, the difunctional amine is an aromatic diamine has a general formula represented by a following formula 1:

[Formula 1]

wherein "X" is nil or selected from the group consisting of following formulas:

"Y" is selected form the group consisting of NH$_2$ and wherein "A" is selected form the group consisting of the following formulas:

and "R$_1$", "R$_2$", "R$_3$", "R$_4$", "R$_5$", and "R$_6$" independently are hydrogen, C1~C6 alkanes, C1~C6 oxyalkanes, C3~C7 cyclic alkanes, —CF$_3$, —OCF$_3$, or halogen.

The structures of synthesized benzoxazines based on aromatic diamine of formula 1 are presented as follow:

and wherein "R" comprises hydrogen, C1~C6 alkanes, C1~C6 oxyalkanes, C3~C7 cyclic alkanes, —CF$_3$, —OCF$_3$, or halogen, and "m" is an integer of 1~2.

In another embodiment, an aromatic diamine with para ether group has a general formula represented by a following formula 2:

[Formula 2]

wherein "$R_1$", "$R_2$", "$R_3$", and "$R_4$" independently are hydrogen, C1~C6 alkanes, C1~C6 oxyalkanes, C3~C7 cyclic alkanes, —CF$_3$, —OCF$_3$, or halogen, and "Ar" is selected from the group consisting of following formulas:

-continued

The structures of synthesized benzoxazine based on aromatic diamine of formula 2 is presented as follow:

In accordance with embodiments of the present invention, a diamine with benzene ring (or naphthalene ring) reacts with 2-hydroxybenzaldehyde to synthesize a benzoxazine with benzene ring (or naphthalene ring).

In one embodiment, a diamine with benzene ring has a general formula represented by a following formula 3:

[Formula 3]

wherein "Ar" is selected from the group consisting of following formulas:

The route of synthesizing the benzoxazine resin by reacting the aromatic diamine of formula 3 and 2-hydroxybenzaldehyde is presented as follow:

wherein "R" comprises hydrogen, C1~C6 alkanes, C1~C6 oxyalkanes, C3~C7 cyclic alkanes, —CF$_3$, —OCF$_3$, or halogen, and "m" is an integer of 1~2.

In accordance with embodiments of the present invention, an aromatic diamine with substitution group reacts with 2-hydroxybenzaldehyde to synthesize a benzoxazine with substitution group.

In accordance with embodiments of the present invention, an aromatic triamine reacts with 2-hydroxybenzaldehyde to synthesize a benzoxazine.

In one embodiment, an aromatic triamine has a general formula represented by a following formula 4:

[Formula 4]

wherein "X" is selected from a group consisting of the following formulas:

"Y" is selected form the group consisting of NH$_2$ and wherein "A" is selected form the group consisting of the following formulas:

and "R$_1$", "R$_2$", "R$_3$", "R$_4$", "R$_5$", and "R$_6$" independently are hydrogen, C1~C6 alkanes, C1~C6 oxyalkanes, C3~C7 cyclic alkanes, —CF$_3$, —OCF$_3$, or halogen.

The structures of synthesized benzoxazines based on aromatic diamine of formula 4 are presented as follow:

and wherein "R" comprises hydrogen, C1~C6 alkanes, C1~C6 oxyalkanes, C3~C7 cyclic alkanes, —CF$_3$, —OCF$_3$, or halogen, and "m" is an integer of 1~2.

In another embodiment, melamine or its derivatives has a general formula represented by a following formula 5:

[Formula 5]

wherein "Z" comprises hydrogen, —NH$_2$, C1~C6 alkanes, C1~C6 oxyalkanes, C3~C7 cyclic alkanes, —CF$_3$, —OCF$_3$, phenyl, or halogen.

The structures of synthesized benzoxazines based on amine of formula 5 are presented as follow:

and

-continued wherein "R" comprises hydrogen, C1~C6 alkanes, C1~C6 oxyalkanes, C3~C7 cyclic alkanes, —CF$_3$, —OCF$_3$, or halogen, and "m" is an integer of 1~2.

Preparation Example 1

Preparation of DDM-Bz

An aromatic diamine, DDM (4,4'-diamino diphenyl methane), was employed as a material to from a DDM-Bz (benzoxazine) by using the 3-step process above-described. Step (I) synthesizes a first intermediate DDM-HB, Step (II) synthesizes a second intermediate DDM-HB-r, and Step (III) synthesizes a DDM-Bz monomer.

Figure 1:
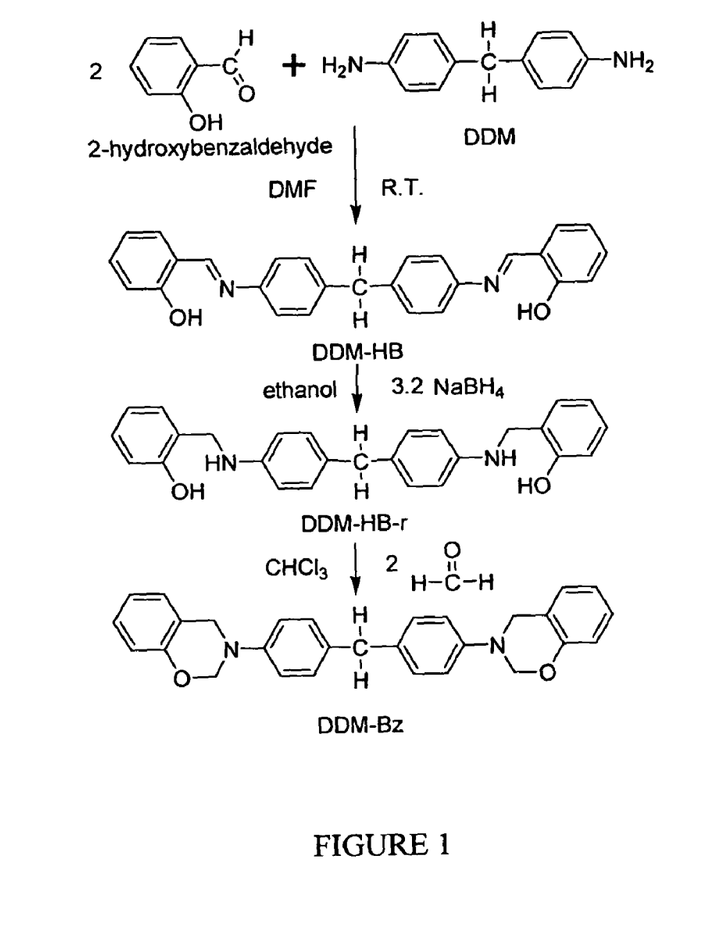
FIG. 1 is a diagram of the 3-step process of the DDM-Bz.

Referring to FIG. 1. FIG. 1 is a diagram of the 3-step process of the DDM-Bz monomer synthesis. An exemplary preparation process is stated in the following description:

Step (I): 24.424 g (0.2 mole) of 2-hydroxybenzaldehyde and 19.826 g (0.1 mole) of DDM were dissolved in 150 ml of DMF (N,N-dimethyl formaldehyde) and stirred in a 100 ml 3-neck flask at room temperature. The operation of step (I) is an exothermic process and large number of yellow educt was precipitated within the period of stirring. After 3 hours stirring, the yellow educt was filtrated and dried in a vacuum oven at 140° C. to obtain a first intermediate powder (DDM-HB) 38.628 g and the yield was 95%. The structure of the DDM-HB is presented as follow:

and the result of the $^1$H-NMR (DMSO-D$_6$) is: δ=4.04 (2H, H$^{12}$), 6.94 (2H, H$^2$), 7.02 (2H, H$^4$), 7.25 (8H, H$^9$ and H$^{10}$), 7.38 (4H, H$^1$ and H$^3$), 8.63 (2H, H$^7$), 13.32 (2H, OH). $^{13}$C-NMR (DMSO-D$_6$), δ=40.99 (C$^{12}$), 117.21 (C$^4$), 119.03 (C$^2$), 119.20 (C$^6$), 121.33 (C$^9$), 129.87 (C$^{10}$), 132.18 (C$^1$), 133.05 (C$^3$), 139.79 (C$^{11}$), 146.62 (C$^8$), 161.08 (C$^7$), 162.16 (C$^5$).

Step (II): Nitrogen was introduced into a reactor by a nitrogen supplier to remove the humidity at first. After about 30 minutes introducing, the nitrogen supplier was turned off and a balloon with hydrogen was assembled on the reactor. 32.5 g of the first intermediate was redissolved in 80 ml of ethanol and added to the reactor. Then 9.68 g of NaBH$_4$ was divided with 3 batches and added into the reactor, and then the reactants were stirred at room temperature to form a mixture. The balloon is taken as a regulator in this process, when the hydrogen of the balloon was consumed out, the next batch of the NaBH4 would be added. After about 10 hours, the mixture was added into water to precipitate a white educt. The white educt then was filtrated and dried to obtain a second intermediate powder (DDM-HB-r) 30.1246 g, and the yield was 91.7%. The structure of the DDM-HB-r is presented as follow:

and the result of the $^1$H-NMR (DMSO-D$_6$) is: δ=3.56 (2H, H$^{12}$), 4.14 (4H, H$^7$), 5.74 (2H, NH), 6.47 (4H, H$^9$), 6.71 (2H, H$^2$), 6.79 (2H, H$^4$), 6.84 (4H, H$^{10}$), 7.02 (2H, H$^3$), 7.16 (2H, H$^1$), 9.48 (2H, OH). $^{13}$C-NMR (DMSO-D$_6$), δ=39.78 (C$^{12}$), 41.59 (C$^7$), 112.19 (C$^9$), 114.79 (C$^4$), 118.74 (C$^2$), 125.90 (C$^6$), 127.35 (C$^3$), 128.15 (C$^1$), 128.89 (C$^{10}$), 129.35 (C$^{11}$), 146.83 (C$^8$), 154.94 (C$^5$).

Step (III): 28.7357 g (0.07 mole) of second intermediate was redissolved in 200 ml of chloroform to form a mixture in a 250 ml 3-neck flask. 11.3589 g (0.07×2 mole) of aqueous formaldehyde was dripped into the mixture and the mixture was stirred for 4 hours at working temperature (about 35° C.) in advance. At 4 hours later, the working temperature was increased until reflux and stirred constantly for 5 hours. After the treatments, the treated mixture was added into an ethanol solution (ethanol:water=1:1) to precipitate the raw DDM-Bz monomer. Then the solvents were further removed by vacuum filtration. The remaining pellet was dried to obtain a purified product and the yield was quantitative. The structure of the DDM-Bz is presented as follow:

and the result of the 1H-NMR (DMSO-D6) is: δ=3.70 (2H, H13), 4.58 (4H, H7), 5.37 (4H, H8), 6.69 (4H, H10), 6.84 (2H, H3), 7.01 (2H, H4), 7.02 (2H, H5), 7.04 (2H, H2), 7.07 (4H, H11). 13C-NMR (DMSO-D6), δ=39.92 (C13), 49.01 (C7), 78.87 (C8), 116.14 (C10), 117.57 (C4), 120.33 (C3), 121.25 (C1), 127.10 (C2), 127.56 (C11), 129.15 (C5), 133.80 (C12), 145.84 (C9), 153.89 (C6).

Figure 1A:
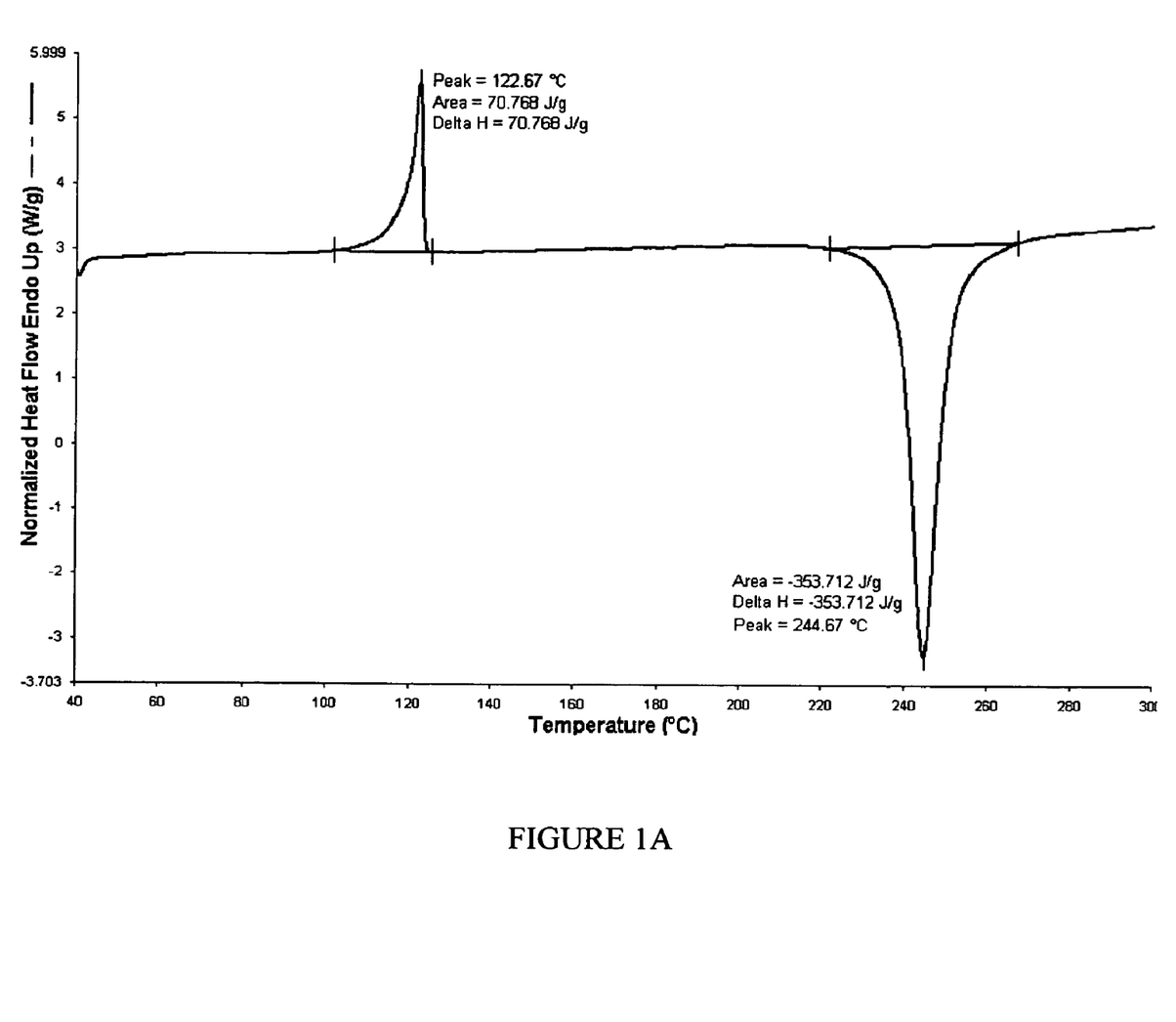
FIG. 1A is a DSC diagram of the DDM-Bz.

Referring to FIG. 1A. FIG. 1A is a DSC diagram of the DDM-Bz. FIG. 1A shows the melting point of the DDM-Bz was 120° C., the exothermic peak temperature was 256° C., and the exothermic enthalpy is 326 Joule/g. The temperature difference between the melting point and exothermic peak was 130° C. that provides excellent mechanical characters.

Figure 1B:
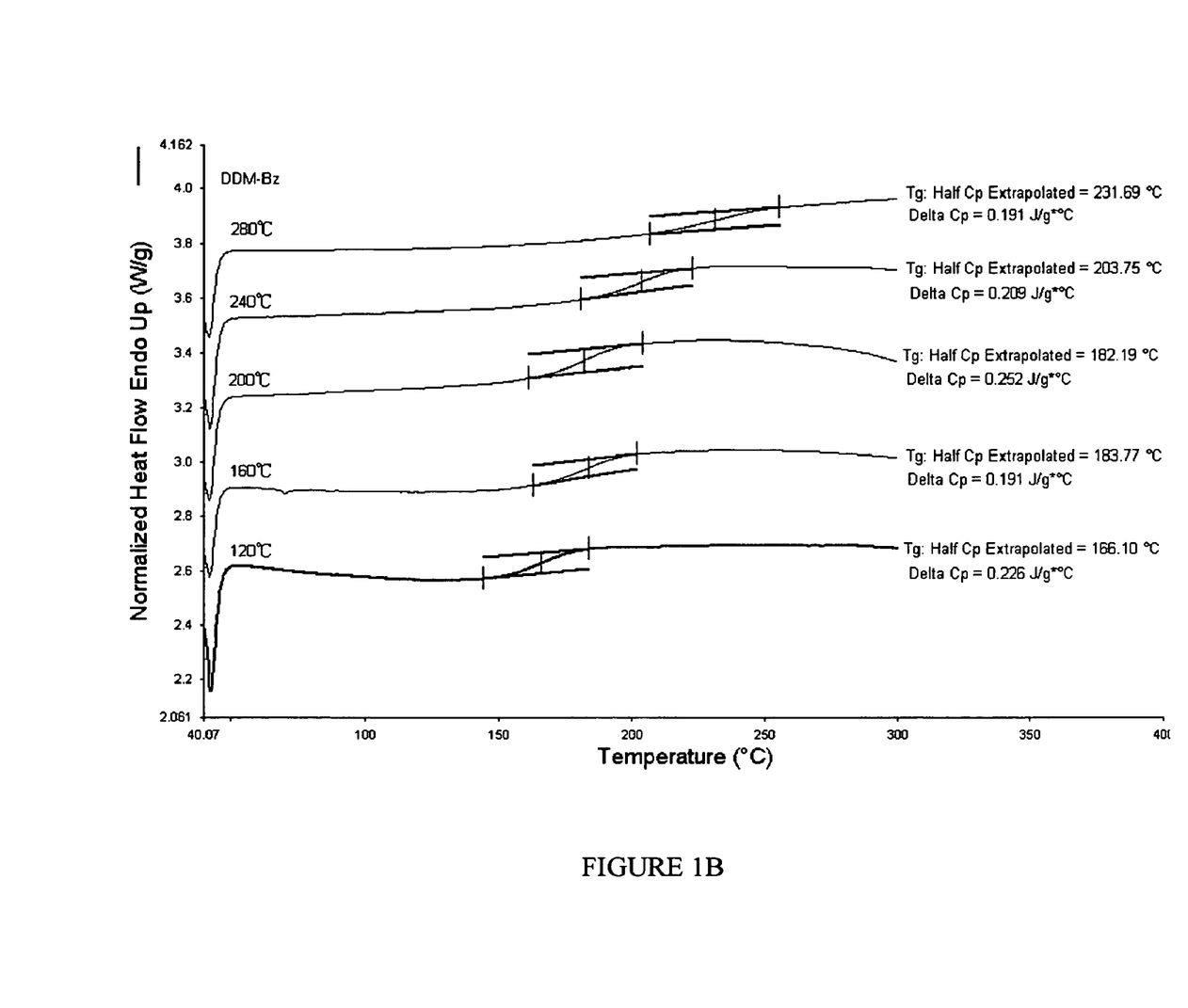
FIG. 1B is a diagram of relationship between glass transition temperature (Tg) and curing temperature of the cured DDM-Bz.

Referring to FIG. 1B. FIG. 1B is a diagram of relationship between glass transition temperature (Tg) and curing temperature of the cured DDM-Bz resin. FIG. 1B shows the glass transition temperature of the cured DDM-Bz, which cured at 280° C. treating, was 231° C. The cured DDM-Bz resin provides higher glass transition temperature than the conventional cured B-a resin for 70° C. The decomposition temperature (Td) at 5% mass loss of the DDM-Bz was 425° C. The carbon residue at 800° C. of the DDM-Bz was 51%.

In contrast, a DDM-Bz resin synthesized by a conventional process (described as below) was exhibited lower yield. 1.2315 g (3 mmole) of DDM was dissolved in 15 ml dioxane in a reactor. 0.9736 g (3×4 mmole) of aqueous formaldehyde was dripped into the reactor and stirred for 5 hours at room temperature. 0.5647 g (6 mmole) of phenol was added in the reactor, and then the temperature was increased with stirring until reflux. After 2 hours stirring, a white solid educt was precipitated in the reactor, and the white solid educt cannot be redissolved in DMF. The presences of insoluble educt indicated that the conventional process of benzoxazine synthesis would result in a gelatinous DDM-Bz resin.

Preparation Example 2

Preparation of BAB-Bz

BAB-Bz was synthesized in a similar procedure of DDM-Bz using an aromatic diamine, bis(4-aminophenoxy)phenyl] ether (BAB), as the starting material. The structure of the BAB-Bz is presented as follow:

and the result of the 1H-NMR (DMSO-D6) is: δ=4.61 (4H, H7), 5.39 (4H, H8), 6.72 (2H, H5), 6.86 (2H, H3), 6.89 (4H, H10), 6.91 (4H, H14), 7.08 (2H, H4), 7.09 (2H, H2), 7.12 (4H, H11). 13C-NMR (DMSO-D6), δ=49.32 (C7), 79.13 (C8), 116.18 (C5), 119.17 (C11), 119.36 (C14), 119.38 (C10), 120.42 (C3), 121.17 (C1), 127.14 (C2), 127.63 (C4), 143.87 (C9), 150.71 (C12), 152.67 (C13), 153.89 (C6).

The melting point of the BAB-Bz was 156° C., the exothermic peak temperature was 256° C., and the exothermic enthalpy is 237 Joule/g. The temperature difference between the melting point and exothermic peak was 100° C. that provides excellent mechanical characters.

The glass transition temperature of the cured BAB-Bz, which cured at 280° C. treating, was 196° C. The cured BAB-Bz resin provides higher glass transition temperature than the conventional cured B-a resin for 35° C. The decomposition temperature (Td) at 5% mass loss of the BAB-Bz was 425° C. The carbon residue at 800° C. of the BAB-Bz was 56%.

Preparation Example 3

Preparation of DDS-Bz

DDS-Bz was synthesized in a similar procedure of DDM-Bz using an aromatic diamine, (4,4-diamino diphenyl sulfone) (DDS), as the starting material. The structure of the DDS-Bz is presented as follow:

and the result of the $^1$H-NMR (DMSO-D$_6$) is, δ=4.71 (4H, H$^7$), 5.47 (4H, H$^8$), 6.74 (2H, H$^4$), 6.88 (2H, H$^2$), 7.08 (2H, H$^3$), 7.11 (2H, H$^1$), 7.23 (4H, H$^{10}$), 7.71 (4H, H$^{11}$). $^{13}$C-NMR (DMSO-D$_6$), δ=48.09 (C$^7$), 76.95 (C$^8$), 115.96 (C$^{10}$), 116.37 (C$^4$), 120.78 (C$^2$), 120.96 (C$^6$), 127.20 (C$^1$), 127.77 (C$^3$), 128.56 (C$^{11}$), 131.99 (C$^{12}$), 151.07 (C$^9$), 153.62 (C$^5$).

The melting point of the DDS-Bz was 209° C., the exothermic peak temperature was 274° C., and the exothermic enthalpy is 249 Joule/g. The temperature difference between the melting point and exothermic peak was 65° C. that provides excellent mechanical characters.

The glass transition temperature of the cured DDS-Bz, which cured at 280° C. treating, was 192° C. The cured DDS-Bz resin provides higher glass transition temperature than the conventional cured B-a resin for 31° C. The decomposition temperature (Td) at 5% mass loss of the DDS-Bz was 426° C. The carbon residue at 800° C. of the DDS-Bz was 57%.

Preparation Example 4

Preparation of BAPP-Bz

BAPP-Bz was synthesized in a similar procedure of DDM-Bz using an aromatic diamine, 2,2-bis(4-aminophenoxy)phenyl)propane (BAPP), as the starting material. The structure of the BAPP-Bz is presented as follow:

and the result of the $^1$H-NMR (DMSO-D$_6$) is: δ=1.57 (6H, H$^{18}$), 4.61 (4H, H$^7$), 5.39 (4H, H$^8$), 6.73 (2H, H$^5$), 6.79 (4H, H$^{10}$), 6.86 (2H, H$^3$), 6.90 (4H, H$^{14}$), 7.08 (2H, H$^4$), 7.09 (2H, H$^2$), 7.12 (4H, H$^{11}$), 7.13 (4H, H$^{15}$). $^{13}$C-NMR (DMSO-D$_6$), δ=30.58 (C$^{18}$), 41.44 (C$^{17}$), 49.30 (C$^7$), 79.10 (C$^8$), 116.20 (C$^5$), 116.98 (C$^{10}$), 119.11 (C$^{11}$), 119.96 (C$^{14}$), 120.42 (C$^3$), 121.15 (C$^1$), 127.13 (C$^2$), 127.62 (C$^4$), 127.78 (C$^{15}$), 144.04 (C$^9$), 144.52 (C$^{16}$), 150.02 (C$^{12}$), 153.90 (C$^{13}$), 155.39 (C$^6$).

Preparation Example 5

Preparation of DOPOTA-Bz

An aromatic triamine, DOPOTA was employed as a material to from a DOPOTA-Bz by using the 3-step process described in Preparation Example 1. Step (I) synthesizes a first intermediate DOPOTA-HB, Step (II) synthesizes a second intermediate DOPOTA-HB-r, and Step (III) synthesizes a DOPOTA-Bz monomer.

Figure 2:
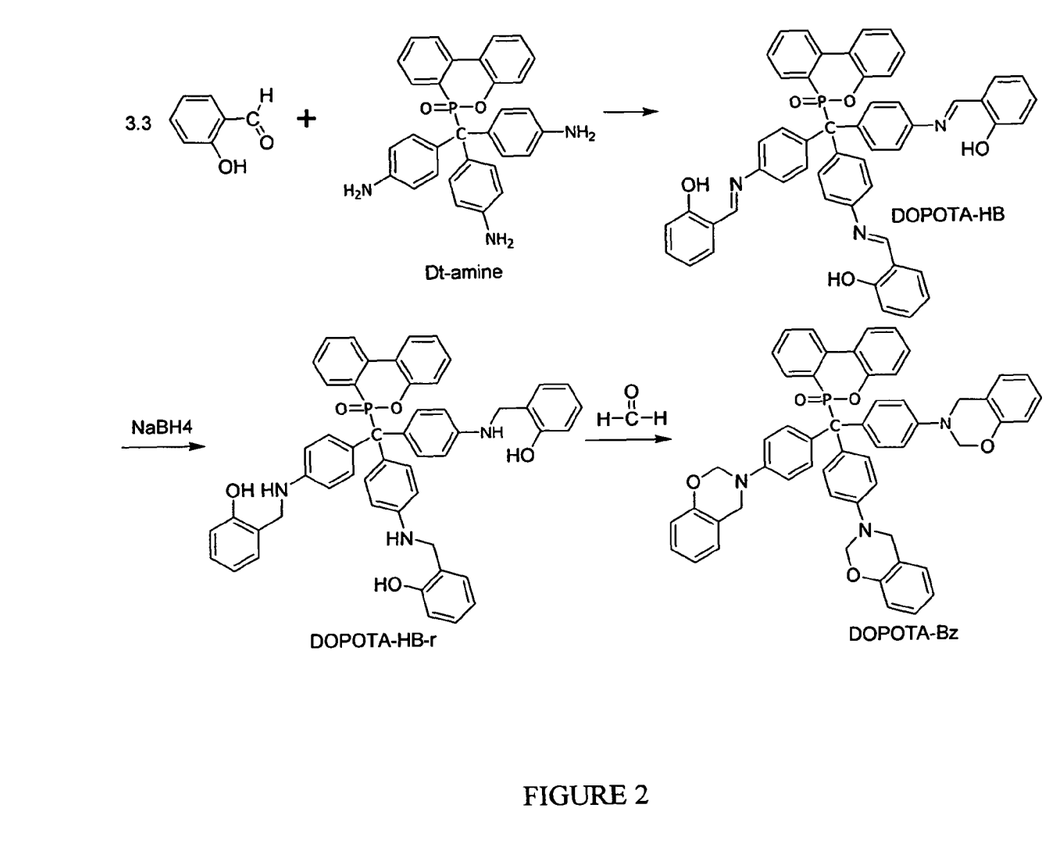
FIG. 2 is a diagram of the 3-step process of the DOPOTA-Bz.

Referring to FIG. 2. FIG. 2 is a diagram of the 3-step process of the DOPOTA-Bz monomer synthesis. An exemplary preparation process is stated in the following description:

Step (I): 40.3 g (0.33 mole) of 2-hydroxybenzaldehyde and 50.35 g (0.1 mole) of DOPOTA were dissolved in 200 ml of DMAC and stirred in a 100 ml 3-neck flask at 70° C. After 8 hours stirring, the reactants were put in the water and a large number of educt was precipitated. The educt was filtrated and dried in a vacuum oven at 90° C. to obtain a first intermediate powder (DOPOTA-HB-r) of 65.268 g and the yield was 80%.

Step (II): Nitrogen was introduced into a reactor by a nitrogen supplier to remove the humidity at first. After about 30 minutes introducing, stopping introduce the nitrogen and assembling a balloon with hydrogen on the reactor. 10 g of first intermediate was redissolved in 120 ml of ethanol and added to the reactor. 2.23 g of NaBH$_4$ was divided with 3 batches and added into the reactor, and each batch of the NaBH$_4$ was added respectively when the hydrogen of the balloon was consumed out. The reactants were stirred at room temperature to form a mixture. After about 10 hours, the mixture was added into water to precipitate a white educt. The white educt then was filtrated and dried to obtain a second intermediate powder (DOPOTA-HB-r) of 9.06 g, and the yield was 90%.

Step (III): 8.22 g (0.07 mole) of the second intermediate was redissolved in 50 ml of chloroform to form a mixture in a 250 ml 3-neck flask. 1.6215 g (0.01×2 mole) of aqueous formaldehyde was dripped into the mixture and the mixture was stirred at working temperature (about 35° C.). After 4 hours stirring, the working temperature was increased until reflux and stirred constantly for 10 hours to precipitate the raw DOPOTA-Bz monomer. Then the solvents were further removed by vacuum filtration. The remaining pellet was dried to obtain a purified DOPOTA-Bz and the yield was quantitative.

Figure 3:
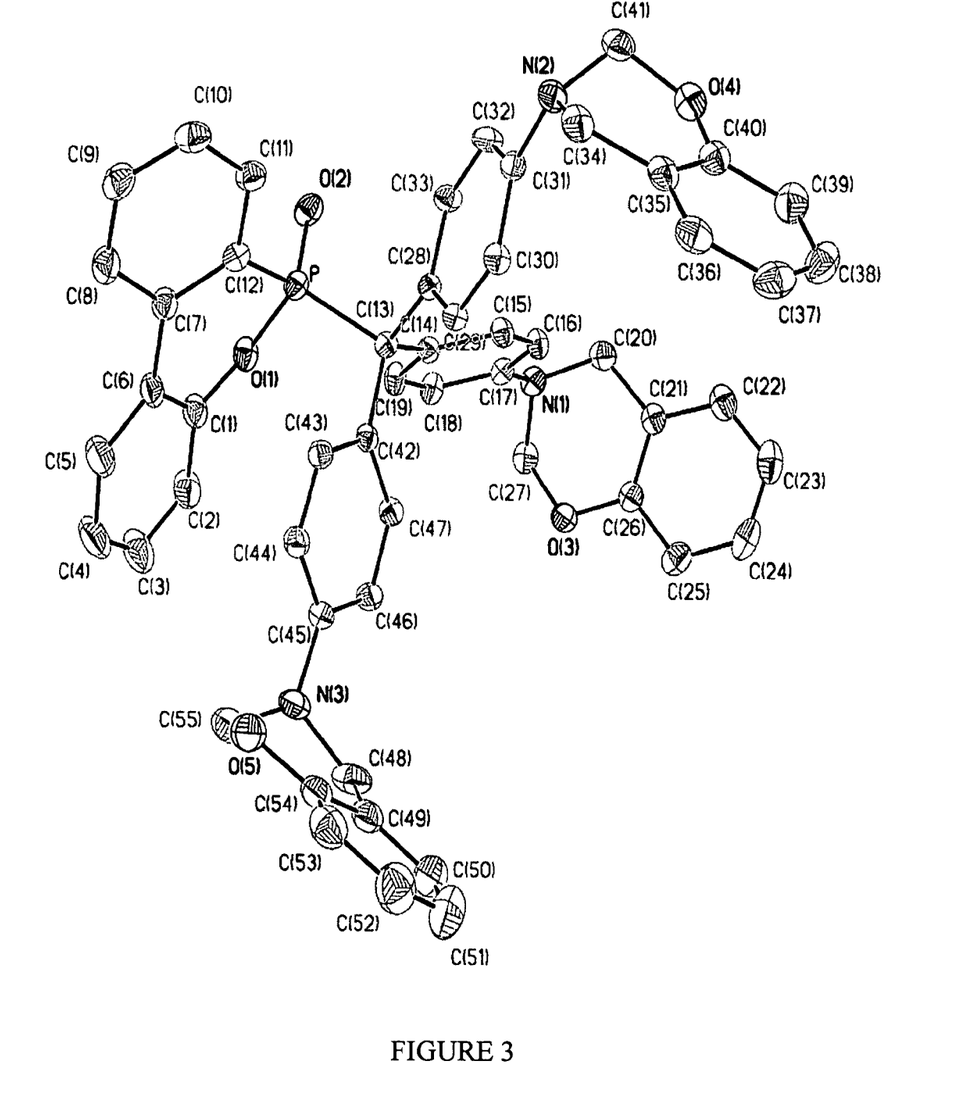
FIG. 3 is the X-ray single crystal diffractogram of DOPOTA-Bz.

Refer to FIG. 3. FIG. 3 shows the X-ray single crystal diffractogram of DOPOTA-Bz, and it verifies the structure of the DOPOTA-Bz.

The embodiments of the present invention employing various multifunctional aromatic amines with different electronegativity value to synthesis the benzoxazines. For example, the $SO_2$ group of DDS provides electron-withdrawing group (high electronegativity), both BAB and BAPP provide strong electron-donating group, and the $CH_2$ group of the DDM provides weak electron-donating group. Besides, DOPOTA provide trifunctional property. The processes of the embodiments of the present invention are adequate to synthesis benzoxazine with high purity and high yield by using the multifunctional amines.

Although the present invention has been described in considerable detail with reference to certain embodiments thereof, other embodiments are possible. For example, aromatic amines, such as other diamines, triamines and tetraamines can be employed as a material for synthesizing various benzoxazines by using similar processes of the embodiments of the present invention. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A process of synthesizing aromatic amine-based benzoxazine resins, comprising:
    reacting the 2-hydroxybenzaldehyde with an aromatic amine to form a first intermediate, wherein the aromatic amine comprises aromatic diamines, aromatic triamines and multifunctional aromatic amines;
    dissolving the first intermediate and adding a reducing agent to reduce the first intermediate, and form a second intermediate;
    redissolving the second intermediate to form a second intermediate mixture;
    adding an aldehyde solution to the second intermediate mixture and reacting at reflux temperature; and
    removing the solvent to obtain a benzoxazine resin.

2. The process of claim 1, wherein the aromatic amine is an aromatic diamine with a general formula represented by a following formula 1:

[Formula 1]

wherein "X" is nil or selected from the group consisting of following formulas:

"Y" is selected form the group consisting of $NH_2$ and wherein "A" is selected form the group consisting of following formulas:

and "$R_1$", "$R_2$", "$R_3$", "$R_4$", "$R_5$", and "$R_6$" independently are hydrogen, C1~C6 alkanes, C1~C6 oxyalkanes, C3~C7 cyclic alkanes, —$CF_3$, —$OCF_3$, or halogen.

3. The process of claim 2, wherein the structures of synthesized benzoxazines based on aromatic diamine of formula 1 are selected from the group consisting of following formulas:

wherein "R" comprises hydrogen, C1~C6 alkanes, C1~C6 oxyalkanes, C3~C7 cyclic alkanes, —CF$_3$, —OCF$_3$, or halogen, and "m" is an integer of 1~2.

4. The process of claim 1, wherein the aromatic amine is an aromatic diamine with a general formula represented by a following formula 2:

[Formula 2]

wherein "R$_1$", "R$_2$", "R$_3$", and "R$_4$" independently are hydrogen, C1~C6 alkanes, C1~C6 oxyalkanes, C3~C7 cyclic alkanes, —CF$_3$, —OCF$_3$, or halogen, and "Ar" is selected from the group consisting of following formulas:

-continued

5. The process of claim 4, wherein the structures of synthesized benzoxazine based on aromatic diamine of formula 2 is presented as follow:

wherein "R" comprises hydrogen, C1~C6 alkanes, C1~C6 oxyalkanes, C3~C7 cyclic alkanes, —CF$_3$, —OCF$_3$, or halogen, and "m" is an integer of 1~2.

6. The process of claim 1, wherein the aromatic amine is an aromatic diamine with a general formula represented by a following formula 3:

[Formula 3]

wherein "Ar" is selected from the group consisting of following formulas:

-continued

7. The process of claim 6, wherein the structures of synthesized benzoxazine based on aromatic diamine of formula 3 is presented as follow:

wherein the "R" comprises hydrogen, C1~C6 alkanes, C1~C6 oxyalkanes, C3~C7 cyclic alkanes, —CF$_3$, —OCF$_3$, or halogen, and "m" is an integer of 1~2.

8. The process of claim 1, wherein the aromatic amine is an aromatic triamine with a general formula represented by a following formula 4:

[Formula 4]

wherein "X" is selected from a group consisting of the following formulas:

"Y" is selected form the group consisting of NH$_2$ and wherein "A" is selected form the group consisting of the following formulas:

and "R$_1$", "R$_2$", "R$_3$", "R$_4$", "R$_5$", and "R$_6$", independently are hydrogen, C1~C6 alkanes, C1~C6 oxyalkanes, C3~C7 cyclic alkanes, —CF$_3$, —OCF$_3$, or halogen.

9. The process of claim 8, wherein the structures of synthesized benzoxazines based on aromatic diamine of formula 4 is selected form the group consisting of the following formulas:

and wherein "R" comprises hydrogen, C1~C6 alkanes, C1~C6 oxyalkanes, C3~C7 cyclic alkanes, —$CF_3$, —$OCF_3$, or halogen, and "m" is an integer of 1~2.

10. The process of claim 1, wherein the aromatic amine is melamine or its derivatives with a general formula represented by a following formula 5:

[Formula 5]

wherein "Z" comprises hydrogen, —$NH_2$, C1~C6 alkanes, C1~C6 oxyalkanes, C3~C7 cyclic alkanes, —$CF_3$, —$OCF_3$, phenyl, or halogen.

11. The process of claim 10, wherein the structures of synthesized benzoxazines based on amine of formula 5 is selected form the group consisting of the following formulas:

and wherein "R" comprises hydrogen, C1~C6 alkanes, C1~C6 oxyalkanes, C3~C7 cyclic alkanes, —$CF_3$, —$OCF_3$, or halogen, and "m" is an integer of 1~2.

12. The process of claim 1, wherein the first intermediate is dissolved by a solvent comprises ethanol and DMF.

13. The process of claim 1, wherein the reducing agent comprises $NaBH_4$, $LiAlH_4$, hydrazine-Pd/c and hydrogen-Pd/c.

14. The process of claim 1, wherein the second intermediate is redissolved by a solvent comprises dioxane, toluene, xylene, or chloroform.

15. The process of claim 1, wherein the aldehyde solution is selected form the group consisting of formaldehyde and paraformaldehyde.

* * * * *